US008058345B2

(12) United States Patent
Liu et al.

(10) Patent No.: US 8,058,345 B2
(45) Date of Patent: Nov. 15, 2011

(54) CURABLE ADHESIVE COMPOSITIONS CONTAINING REACTIVE MULTI-FUNCTIONAL ACRYLATE

(75) Inventors: Wen-Feng Liu, Naperville, IL (US); Barbara Chabut, Valence (FR)

(73) Assignee: Illinois Tool Works Inc., Glenview, IL (US)

( * ) Notice: Subject to any disclaimer, the term of this patent is extended or adjusted under 35 U.S.C. 154(b) by 64 days.

(21) Appl. No.: 12/463,082

(22) Filed: May 8, 2009

(65) Prior Publication Data

US 2009/0215964 A1 Aug. 27, 2009

Related U.S. Application Data

(62) Division of application No. 10/679,806, filed on Oct. 6, 2003, now Pat. No. 7,544,739.

(60) Provisional application No. 60/425,091, filed on Nov. 8, 2002, provisional application No. 60/425,099, filed on Nov. 8, 2002.

(51) Int. Cl.
*C08G 63/48* (2006.01)

(52) U.S. Cl. ........ 525/65; 525/329.9; 525/529; 525/530

(58) Field of Classification Search .................. 525/529, 525/65, 530, 329.9
See application file for complete search history.

(56) References Cited

U.S. PATENT DOCUMENTS

| | | | | |
|---|---|---|---|---|
| 3,066,112 A | 11/1962 | Bowen | | |
| 3,256,226 A | 6/1966 | Fekete et al. | ................. | 260/23.5 |
| 3,317,465 A | 5/1967 | Doyle et al. | .................... | 260/47 |
| 3,345,401 A | 10/1967 | May | .............. | 260/486 |
| 3,373,221 A | 3/1968 | May | .............. | 260/837 |
| 3,377,406 A | 4/1968 | Newey et al. | ................. | 260/837 |
| 3,432,478 A | 3/1969 | May | .............. | 260/78.5 |
| 3,548,030 A | 12/1970 | Jernigan et al. | .............. | 260/836 |
| 3,564,074 A | 2/1971 | Avallone et al. | .............. | 260/837 |
| 3,634,542 A | 1/1972 | Dowd et al. | ................... | 260/837 |
| 3,637,618 A | 1/1972 | May | .............. | 260/837 |
| 4,051,195 A | 9/1977 | McWhorter | | |
| 4,518,283 A * | 5/1985 | Gebauer et al. | ............ | 405/259.5 |
| 4,651,875 A | 3/1987 | Lang et al. | .................... | 206/219 |
| 4,706,806 A | 11/1987 | Mauthe | ........................ | 206/219 |
| 4,729,696 A | 3/1988 | Goto et al. | .................... | 405/261 |
| 4,766,186 A | 8/1988 | Sellstrom et al. | | |
| 4,935,454 A | 6/1990 | Koblitz et al. | | |
| 4,944,819 A | 7/1990 | Gebauer | ........................ | 156/78 |
| 5,157,072 A * | 10/1992 | Hense et al. | .................. | 524/553 |
| 5,614,299 A | 3/1997 | Yamamoto et al. | | |
| 5,891,942 A | 4/1999 | Parish et al. | | |
| 6,015,845 A * | 1/2000 | Yonetani et al. | .............. | 523/130 |
| 6,037,408 A | 3/2000 | Weber et al. | | |
| 6,291,555 B1 | 9/2001 | Surjan et al. | | |
| 6,420,496 B1 | 7/2002 | Moon et al. | | |
| 6,489,396 B2 * | 12/2002 | Nakamura et al. | ............ | 525/117 |
| 6,583,259 B1 | 6/2003 | Weber et al. | | |
| 7,244,793 B2 | 7/2007 | Liu et al. | | |
| 2002/0010282 A1 | 1/2002 | Kish et al. | | |
| 2003/0181571 A1 | 9/2003 | Kish et al. | | |
| 2004/0127680 A1* | 7/2004 | Chabut et al. | ................. | 528/408 |
| 2009/0131608 A1 | 5/2009 | Liu et al. | | |

FOREIGN PATENT DOCUMENTS

| | | |
|---|---|---|
| DE | 3617702 A1 | 12/1987 |
| DE | 4121833 C1 | 9/1992 |
| EP | 66447 A1 | 12/1982 |
| EP | 0150555 B1 | 8/1985 |
| EP | 0199671 * | 3/1986 |
| EP | 0534197 A1 | 3/1993 |
| EP | 0589831 A1 | 3/1994 |
| EP | 703197 | 3/1996 |
| EP | 0708258 A2 | 4/1996 |
| EP | 875546 | 11/1998 |
| EP | 0638705 B1 | 6/2001 |
| EP | 1424378 A2 | 6/2004 |
| EP | 1424378 B1 | 3/2008 |
| JP | 08-295864 | 11/1996 |
| JP | 08-325358 | 12/1996 |
| JP | 09 296027 | 11/1997 |
| JP | 10-182938 | 7/1998 |
| JP | 2001089716 A | 4/2001 |
| JP | 2002-53668 | 2/2002 |
| JP | 2008134426 A | 6/2008 |
| WO | WO9301246 A1 | 1/1993 |
| WO | WO 2005030894 A2 | 4/2005 |

OTHER PUBLICATIONS

International Search Report received in WO2005030894, 2005.
Supplementary European Search Report received in EP1673411, Jan. 14, 2009.
Written Opinion received in WO2005030894, 2006.
Vieweg et al., Plastics Handbook vol. VIII Polyeseter, Carl Hanser Verlag, 1973, Munich, pp. 276 and 278. (English translation).
http://lexikon.meyers.de/wissen/Phenolharze+%28Sachartikel%29, Nov. 20, 2008. (English translation).
http://lexikon.meyers.de/medien/
Phenolharze+%28Grafiken%29+Chemie, Nov. 20, 2008. (English translation). Iijima et al., Modification of Epoxy Resins with Poly(aryl ether ketone)s, J. Appl. Polymer Science, 1991, vol. 43, pp. 1685-1692.
ES-report ESR-1562, http://www.us.hilti.com/data/techlib/docs/approvals-listings-reports/icbo/ESRHITTZ.pdf, Dec. 2004, pp. 1-5.
Material Safety Data Sheet Hilti HIT-HY150, Dec. 20, 2002.
Encyclopedia of Chemical Technology, Fourth Edition, 1996, vol. 19; John Wiley & Sons, New York etc, pp. 654-656.
Encyclopedia of Chemical Technology, Fourth Edition, 1997, vol. 22, John Wiley & Sons, New York etc., pp. 984-985.
Cowie, "Chemistry Physics of Modern Materials", 2nd edition, 1991 (reprint 1994), Blackie Academic and Professional/Chapman & Hall, Glasgow, pp. 345-346.
Letter from Maucher, Börjes & Kollegen, Lawyers and Patent Attorneys, to the European Patent Office, Munich, Dec. 1, 2008.
Letter from Maucher, Börjes & Kollegen, Lawyers and Patent Attorneys, Freiburg, Germany To the European Patent Office, Nov. 18, 2010.
Letter from Maucher, Börjes & Kollegen, Lawyers and Patent Attorneys, Freiburg, Germany to the European Patent Office, Sep. 2, 2009.
Letter from Bloch & Gevers to the European Patent Office, May 6, 2009.

* cited by examiner

*Primary Examiner* — Bernard Lipman
(74) *Attorney, Agent, or Firm* — Bell & Manning, LLC

(57) ABSTRACT

Disclosed are adhesive compositions include polymerizable resin, preferably in an amount of from about 10 wt % to about 90 wt % and multifunctional acrylate, preferably in an amount of from about 5 wt % to about 30 wt %. The polymerizable resin can include free radical initiated vinyl addition resins. The adhesives in preferred embodiments exhibit enhanced bonding strength of the adhesive at high temperatures, such as at about 80° C., and enhanced the fire resistance.

24 Claims, No Drawings

CURABLE ADHESIVE COMPOSITIONS CONTAINING REACTIVE MULTI-FUNCTIONAL ACRYLATE

RELATED APPLICATIONS

The present application is a divisional application based on U.S. application Ser. No. 10/679,806 filed Oct. 6, 2003, now U.S. Pat. No. 7,544,739, which is related to and claims the priority benefit of U.S. provisional application Nos. 60/425,091 and 60/425,099, each of which was filed on Nov. 8, 2002 and all of which are incorporated herein by reference.

TECHNICAL FIELD

The present invention relates to adhesive compositions especially well adapted for use in anchoring materials in or to concrete or masonry, and to methods of anchoring. More particularly, this invention relates to curable adhesive compositions comprising polymerizable vinyl containing compound(s) and reactive multi-functional acrylate compound(s), to methods for bonding using such compositions, and to the bonded structures produced using such compositions or methods.

BACKGROUND OF THE INVENTION

Many applications require that a material be anchored in or to concrete or masonry. For example, anchor bolts are employed in various fields of engineering and construction as strengthening or reinforcing members in rock formations, or in concrete or masonry structural bodies. The bolts, which are typically metallic, are inserted into holes in the rock formations, or concrete or masonry structural bodies, and are fixed or anchored therein by means of an anchor composition. Objects that have been attached to concrete or masonry using anchor bolts include, but are not limited to, electrical conduits, panels, piping and wall sections. Adhesive anchors are preferred over mechanical anchors for anchoring in soft concrete or masonry because, among other reasons, adhesive anchors place less stress on the concrete or masonry. As used herein, the term "masonry" shall include, but is not limited to, stone, brick, ceramic tile, cement tile, hollow concrete block and solid concrete block.

It has been known to use curable synthetic resins as the primary adhesive for the safe fastening of anchoring rods, bolts and similar devices in solid rock, masonry, concrete and the like. Typically, but not exclusively, certain of the starting components of the adhesive composition are kept separate from one another and then combined at or near the point of fastening. In such so called two part systems, the components which are kept separate until the time of use are combined at the site and then introduced to the anchor bolt, the bore or hole prepared to receive the bolt, or both. Thus, the formation of the cured adhesive body that binds the fastener to the base structure is initiated at about the time the fastener is placed in its final position.

Many of the curable adhesive compositions currently used in the industry, and in particular the field of anchoring in or to concrete, rock, and like materials, are based on compounds that are polymerized or cured by addition polymerization of monomers, oligomers, prepolymers and like compounds that have at least one ethylenic unsaturation in the molecule and thus undergo vinyl addition polymerization curing. For example, many acrylic and epoxy-based adhesive compositions are cured by this mechanism this fashion.

Although the curable adhesive compositions, which have heretofore been used as anchor compositions, have performed with a certain degree of success, applicants have come to appreciate that dramatic and unexpected improvement in performance is not only desirable but also possible.

SUMMARY

Applicants have discovered that the performance of many types of adhesive compositions, but preferably adhesives cured by vinyl addition polymerization and even more preferably free radical initiated vinyl addition polymerization, can be dramatically improved by incorporation into the adhesive formulation a reactive multifunctional acrylate. Applicants have found that the incorporation of reactive multifunctional acrylate into adhesive compositions enhances the bonding strength of the adhesive, particularly at relatively high temperatures, such as at about 80° C., and also in certain embodiments enhances the fire resistance of the cured adhesive.

While it is contemplated that the reactive multifunctional acrylate of the present invention may be used to best advantage in adhesives based on free radical-initiated vinyl addition polymerization, it is believed that use of the reactive multifunctional acrylate may also provide substantial benefit to adhesives generally, including those adhesives which undergo polycondensation polymerization, acid catalyzed vinyl addition polymerization, base catalyzed vinyl addition polymerization, and combination of two or more of any of these forms of polymerization.

In certain preferred embodiments, the adhesive formulation is acrylic-based, including by way of example the acrylic-based adhesives disclosed in U.S. Pat. No. 5,965,635—Rancich et al, which is incorporated herein by reference. In other preferred embodiments the adhesive vinyl ester based, as described in more detail hereinafter.

In general, however, the adhesive compositions of the present invention include from about 10 wt % to about 90 wt % of polymerizable resin and from about 5 wt % to about 30 wt %, multifunctional acrylate. As used herein the term "reactive multifunctional acrylate" refers to compounds that have at least two acrylate functionalities that are reactive, under the conditions used to cure the adhesive, with at least one of the compounds involved in the curing reaction or formed by the curing reaction. As used herein, the term "acrylate functionality" refers to a functional group having the general structure illustrated below:

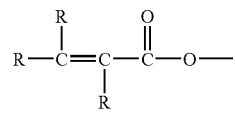

where R may be any group, which does not substantially interfere with or prevent reaction of the multifunctional acrylate compound with the polymerizable resin. In preferred embodiments, R is independently H or a substituted or unsubstituted alkyl, aryl, oxyalkyl, arylalkyl, or oxyalkylaryl. In highly preferred embodiments each R is H.

Applicants have found that exceptional results can be achieved in accordance with the present invention by use of the present reactive multifunctional acrylate with polymerizable resins comprising, and preferably consisting essentially of, select polymerizable vinyl ester compounds in combination with a select reactive diluent for the polymerizable vinyl ester compounds. Furthermore, applicants have discovered that unexpectedly superior performance is possible when the polymerizable vinyl ester compounds are present in the adhesive compositions in amounts of from about 10 wt % to about 30 wt %, and even more preferably from about 10 wt % to about 25 wt %, particularly when such amounts are used in combination with a substantially styrene-free reactive diluent, preferably vinyl toluene, in a vinyl ester:reactive diluent weight ratio of from about 0.8 to about 3, and even more preferably from about 0.8 to about 1.5. Furthermore, applicants have found that unexpectedly superior results are generally achieved when the polymerizable vinyl ester compounds are present in the adhesive compositions in amounts of from about 70 pbwa to about 95 pbwa, and even more preferably about 85 pbwa to about 95 pbwa, wherein the term "pbwa" means part by weight based on active components, as more particularly defined hereinafter.

One aspect of the present invention provides an adhesive composition comprising polymerizable vinyl ester comprising one or more repeating units and at least one terminal vinyl carboxylate, preferably a $C_3$-$C_6$ vinyl carboxylate, where the ratio of the number of repeating units to the number of terminal vinyl carboxylate units is, on average in the composition, from about 0.4 to about 2.0.

Another aspect of the present invention provides adhesive compositions which are especially well adapted for anchoring materials in or to concrete or masonry, which comprises, in combination with reactive multifunctional acrylate, a polymerizable vinyl ester corresponding to formula (I) below,

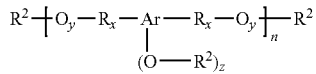

wherein
Ar is substituted or unsubstituted aryl radical with a valence of at least two,
R is independently a substituted or unsubstituted divalent radical derived from alkyl, oxyalkyl, arylalkyl, or oxyalkylaryl,
$R^2$ is independently H, substituted or unsubstituted vinyl carboxylate radical, substituted or unsubstituted epoxide ester radical, or R,
for each $R_x$, x is independently 0 or 1,
for each $O_y$, y is independently 0 or 1,
for each $(O-R^2)_z$, z is independently 0 to 4, provided that at least one y must not be zero if z is zero, and
n is from about 1 to about 5.

An important aspect of certain embodiments of this aspect of the present invention resides in the formulation of the adhesive to include the polymerizable vinyl ester compounds of formula I such that the ratio of n to the number of vinyl carboxylate $R^2$ groups is, on average for the composition, from about 0.4 to about 2.0, more preferably from about 0.4 to about 0.7, and even more preferably from about 0.4 to about 0.5.

Generally, the compositions of the present invention also include an ethylenically unsaturated monomer reactive with the polymerizable vinyl ester and compatible with the reactive multifunctional acrylate. It is sometimes common practice to refer to such a combination of polymerizable polymer and reactive diluent as a "resin," and such terminology will sometimes be used herein to refer to such combinations. In certain highly preferred aspects of the present invention, the reactive diluent comprises vinyl toluene, and even more preferably contains no substantial portion of styrene.

In another aspect of the present invention, the present composition comprises polymerizable vinyl ester having a glass transition temperature ($T_g$) of from about 80° C. to about 130° C., and more preferably from about 90° C. to about 110° C. The preferred compositions also have a heat diffraction temperature (HDT) of from about 90 EC to about 130 EC, and more preferably from about 100° C. to about 120° C. In certain preferred embodiments, the vinyl ester has a glass transition temperature of about 130 EC and a heat diffraction temperature (HDT) of about 130° C.

Optionally but preferably the present compositions also include a curing catalyst, activator and filler.

An important aspect of the present invention is the provision of adhesive compositions, which produce excellent bond strength, particularly at relatively high temperatures. In preferred embodiments, the present adhesive compositions achieve pull out performance at one hour at a temperature of about 23° C. of at least about 70 KN, and at about 24 hour at a temperature of 23° C. of at least about 80 KN, and after about 24 hours at about 80° C. has a pull out force measured at a temperature of 80° C. of at least about 50, with pull out force being measured as in the examples hereof.

DETAILED DESCRIPTION OF PREFERRED EMBODIMENTS

The present invention provides adhesive compositions, and more particularly compositions and methods for anchoring materials in or to concrete or masonry. The materials to be anchored in or to concrete or masonry include, but are not limited to, metallic objects, such as steel bolts, ceramics, other concrete or masonry objects, plastics, glasses and woods.

The present compositions comprise active components and optionally but preferably certain inactive components. As used herein, the term "active components" refers to those components, which participate in curing of the composition, either directly as a reactant or indirectly as a catalyst, inhibitor or the like.

As mentioned above, one of the important active components of the present invention is the reactive multifunctional acrylate. It is contemplated that numerous compounds are adaptable for use as the reactive multifunctional acrylate of the present invention, and all such compounds are useful within the broad scope of the present invention. In highly preferred embodiments, the reactive multifunctional acrylate is at least tri-functional, and in certain embodiments at least tetra-functional, and in certain other embodiments at least penta-functional. Of course, the reactive multifunctional acrylate of the present invention may comprise a combination of two or more multi-functional acrylate compounds, with each independently having the same or different levels of functionality. A preferred tri-functional acrylate is trimethylolpropane, which is sold under the trade designation SR-351 by Sartomer Company of Exton, Pa., USA. A preferred penta-functional acrylate is dipentaerythritol tetraacrylate, which is sold under the trade designation SR-399 by Sartomer Company of Exton, Pa., USA.

Although applicants do not intend to be bound by or to any particular theory of operation, it is believed that the reactive multifunctional acrylates of the present invention act to provide numerous and effective cross-linking sites for the adhesive composition as it cures, thus improving the density and other physical properties of the cured adhesive, such as pull out strength and fire resistance.

The relative amount of reactive multifunctional acrylate included in the present compositions may vary widely depending on numerous factors, such as for example the functionality of the compound, the other components of the composition, and the like. Nevertheless, the preferred embodiments of the present adhesive compositions comprise from about 1 weight percent (wt. %) to about 40 wt % of reactive multifunctional acrylate, more preferably from about 3 wt % to about 30 wt %, and even more preferably from about 5 wt % to about 10 wt %. It is also preferred that the present adhesive compositions comprise from about 5 pbwa to about 30 pbwa of reactive multifunctional acrylate, more preferably from about 10 pbwa to about 30 pbwa, and even more preferably from about 10 pbwa to about 25 pbwa. As used herein, the designation "pbwa" means parts by weight based on the total active components in the adhesive composition. Furthermore, unless otherwise specifically indicated to the contrary, the weight percentages and pbwa of the components in the present adhesive compositions as specified herein refer to the composition after it has been formulated for use in bonding. Thus, for two part compositions of the type described hereinafter, the percentages and pbwa values refer to the adhesive composition based on the combination of parts A and B of such compositions.

Further in terms of active components, the present compositions comprise at least one polymerizable compound, preferably in the form of a resin. Although the remainder of this specification will refer to compositions based on vinyl ester resins, it will be appreciated by those skilled in the art that the descriptions contained herein with respect to on vinyl ester resins can be adapted for use in connection with other types of resins.

The present compositions comprise at least one polymerizable vinyl ester compound and optionally but preferably a reactive diluent for the polymerizable vinyl ester compound. Other active components that are included in certain preferred embodiments include, but are not limited to, catalyst (preferably a free-radical catalyst), chain transfer agent, inhibitor (preferably a free-radical inhibitor), activator, promoter, impact modifier, cross linking agent and coupling agent. In terms of inactive components, it is desirable in certain embodiments to include in the composition filler, non-reactive diluent, thixotropic agent, fragrance, antifoaming agents, wetting agents, and fungicides.

It is contemplated that the relative proportions of the components included in the present compositions may vary widely depending on numerous factors, such as for example the contemplated environment of use, the desired strength of the bond to be formed, the particular materials to be bonded, and other factors. Nevertheless, the preferred aspects of the present adhesive compositions comprise from about 5 weight percent (wt. %) to about 50 wt % of polymerizable vinyl ester compound, more preferably from about 10 wt % to about 40 wt %, and even more preferably from about 10 wt % to about 30 wt %. It is also preferred that the present adhesive compositions comprise from about 20 pbwa to about 65 pbwa of polymerizable vinyl ester compound, more preferably from about 25 pbwa to about 60 pbwa, and even more preferably from about 30 pbwa to about 60 pbwa.

As described above, the present compositions preferably contain polymerizable vinyl ester compound in the form of vinyl ester resin, which includes reactive diluent. Although the relative amounts of reactive diluent of vinyl ester may vary widely within the scope hereof, it is generally preferred that the vinyl ester resin comprise from about 35 wt. % to about 65 wt. %, on the basis of the total weight of the resin, of reactive diluent, with the balance preferably consisting essentially of polymerizable vinyl ester compound. In such embodiments, it is preferred the present adhesive compositions comprise from about 20 weight percent (wt. %) to about 70 wt % of vinyl ester resin, more preferably from about 30 wt % to about 50 wt %, and even more preferably from about 35 wt % to about 45 wt % of said resin. It is also preferred that the present adhesive compositions comprise from about 70 pbwa to about 98 pbwa of said resins, more preferably from about 75 pbwa to about 95 pbwa, and even more preferably from about 85 pbwa to about 95 pbwa of such resins.

The composition may be dispensed using various methods known to those skilled in the art. For example, the composition may be dispensed using a dual cartridge device similar to a caulk gun, or the composition may be dispensed using a glass or film capsule. The composition may also be dispensed in bulk from bulk containers using meter-mix equipment, which is known to those skilled in the art. U.S. Pat. Nos. 4,651,875, 4,706,806 and 4,729,696, the disclosures of each of which are incorporated herein by reference, are directed to the use of glass capsules to dispense the composition in the form of a two part system. It is recognized that the amounts of the various components of the anchor composition may vary depending on many factors, including on the type of dispensing system used.

In preferred dispensing methods, the anchor composition is formed by the mixing of a first composition (sometimes referred to herein as the "A" part) which contains the resin, and which may contain an inhibitor to prevent premature polymerization, but does not include any substantial amount of curing catalyst and a second composition (sometimes referred to herein as the "B" part) which contains the catalyst and which remains apart from the A part until the time of use. Typically, mixing of the A part and the B part occurs immediately before the anchor composition is to be used. For example, when the anchor composition is dispensed using a dispensing gun, the first composition and the second composition, which are contained in separate cartridges of the dispensing gun, may be mixed as they are ejected from the cartridges and applied to either the concrete or masonry, the material to be anchored to the concrete or masonry, or both. Similarly, when the anchor composition is dispensed using a glass capsule, the capsule is typically comprised of two chambers that contain the first composition and the second composition, respectively. When the glass capsule is crushed, the two chambers are crushed and the contents are allowed to mix, forming the anchor composition. For embodiments in which the anchor composition is dispersed in bulk, the A part and the B part may be stored in separate bulk containers and combined through pumping with mixing in the appropriate ratio to make the anchor composition.

Although the present invention is described above in the form of a two part composition, it is contemplated that it may be possible to formulate adhesives in accordance with the present invention as a one-part adhesive, and such formulations are within the scope of the present invention. For example, it may be possible to formulate the present adhesives as in the form of a single component anaerobic adhesive, and such a formulation is within the scope hereof.

It is also generally contemplated that the amount of catalyst used in the present compositions may vary widely depending on numerous factors, the present adhesive compositions preferably comprise from about 0.5 wt % to about 10 wt % of catalyst, more preferably from about 1 wt % to about 8 wt %, and even more preferably from about 2 wt % to about 6 wt % catalyst. It is also preferred that the present adhesive compositions comprise from about 0.5 pbwa to about 25 pbwa of catalyst, more preferably from about 5 pbwa to about 20 pbwa, and even more preferably from about 5 pbwa to about 15 pbwa of catalyst.

Initiators and activators, if included in adhesive compositions of the present invention, as is preferred, are preferably present in amounts of up to about 0.05 wt % to about 1 wt %, and even more preferably from about 0.1 wt % to about 0.5 wt %. It is also preferred that the present adhesive compositions comprise from about 0.1 pbwa to about 5 pbwa of initiator and even more preferably from about 0.1 pbwa to about 1 pbwa.

Promoters are typically used in amounts up to about 0.5% by weight of the composition, and preferably about 1 part per million to about 0.5% by weight of the entire composition.

The preferred aspects of the above-noted components other than the reactive multifunctional acrylate, together with the type and amounts of other additives to the present compositions, are described in detail below.

The Polymerizable Vinyl Ester Compound

It is contemplated that known methods for formation of polymerizable vinyl ester compounds and resins can be adapted in view of the teachings contained herein to form compounds and resins in accordance with the present invention, and all such materials are considered to be within the scope hereof. In preferred embodiments, the polymerizable vinyl ester of the present invention is formed by the reaction of an epoxy compound with an ethylenically unsaturated carboxylic acid, anhydride or alcohol, usually with the use of a polymerization inhibitor to prevent the vinyl ester resin from gelling. In view of the teaching contained herein, it is believed that vinyl ester resin in accordance with the present invention may be prepared by any of the methods disclosed in any of the following patents, each of which is incorporated herein by reference: U.S. Pat. No. 3,256,226 to Fekete et al., and U.S. Pat. No. 3,317,465 to Doyle et al., both assigned to H. H. Robertson Co.; U.S. Pat. No. 3,345,401 to May; U.S. Pat. No. 3,373,221 to May; U.S. Pat. No. 3,377,406 to Newey; and U.S. Pat. No. 3,432,478 to May, all assigned to Shell Oil Co.; U.S. Pat. No. 3,548,030 to Jernigan; and U.S. Pat. No. 3,564,074 to Swisher et al., both assigned to Dow Chemical Co.; U.S. Pat. No. 3,634,542 to Dowd et al.; and U.S. Pat. No. 3,637,618 to May, both assigned to Shell Oil Co.

Preferably, the epoxy vinyl ester is prepared by reacting the polyepoxide and the acid or derivative thereof in appropriate amounts, generally with heating and in the presence of a catalyst, such as a trivalent chromium salt, as for example $CrC_3$; or a phosphine; alkali, onium salt; or a tertiary amine, for example, tris(N,N-dimethylaminomethyl phenol). Optionally, the epoxy vinyl ester resin can be formed in the presence of a non-resinous, vinyl monomer, preferably not including styrene and preferably including vinyl toluene. The resulting product, which is a combination of the polymerizable vinyl ester and reactive diluent, will, in such an instance, constitute what is referred to herein as a "vinyl ester resin" and more specifically as an "epoxy vinyl ester resin."

Examples of epoxy compounds which may be used in such formation reactions include but are not limited to those found in bisphenolic type epoxy resins, epoxy novolac type resins, amine type epoxy resins, copolymerized epoxy resins, multifunctional epoxy resins and the like. Preferably the epoxy used to form the present polymerizable vinyl ester has about 2 to about 3 of an average number of epoxy groups in the molecule.

The bisphenolic type epoxy resin compounds which may be used include, but are not limited to, those found in bisphenol A, F and S type epoxy resins, each of such compounds preferably having 2 glycidyl groups in its molecule. Commercially available examples of bisphenol A type epoxy resin having 2 glycidyl groups in the molecule include those available from Reichhold under the trade designation EPOTUF® 37-140. Commercially available examples of bisphenol F type epoxy resin having 2 glycidyl groups in the molecule include those available from Reichhold under the trade designation EPOTUF® 37-138. In certain embodiments bisphenol S type epoxy resin having 2 glycidyl groups in the molecule, and brominated bisphenol A type epoxy resins, preferably also having 2 glycidyl groups in the molecule, may also be used.

Epoxy novolac type resin compounds may also be used, and such resins are exemplified by phenolic novolac, cresolic novolac, aliphatic, alicyclic or monocyclic epoxy resins.

Aliphatic type epoxy resin compounds may also be used, and such resins include, among others, hydrogenated bisphenol A type epoxy resin having 2 glycidyl groups in its molecule. Such resins are commercially available from Reichhold under the trade designation EPOTUF® 37-051.

Alicyclic epoxy type resin compounds may also be used, and such resin compounds include, among others, alicyclic diepoxyacetal, dicyclopentadiene dioxide and vinylcyclohexene dioxide and the like, which have 2 epoxy groups in the molecule. Such epoxy resin compounds having one epoxy group in the molecule includes vinylhexene monoxide, glycidyl methacrylate and the like.

Monocyclic epoxy type resin compounds may also be used, and such resin compounds include, among others, resorcinol diglycidyl ether, diglycidyl terephthalate and the like.

Amine type epoxy resin compounds may also be used, and such resin compounds include, among others, compounds having 4 glylcidyl groups in the molecule.

These epoxy resins type compounds can be used alone or in combination. The average number of glycidyl groups in the molecule of the epoxy resin is preferably from about 1 to about 6, more preferably from about 2 to about 4, and even more preferably from about 2 to about 3.

In preferred embodiments, the epoxy compound used to form the polymerizable vinyl ester of the present invention corresponds to formula (II) below:

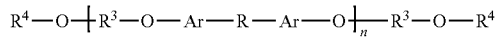

wherein
Ar is substituted or unsubstituted aryl.
R is substituted or unsubstituted divalent radical derived from alkyl, oxyalkyl, arylalkyl, or oxyalkylaryl, alkyl or arylalkyl,
$R^1$ is independently H or R,
for each $R_x$, x is independently 0 or 1,
for each $O_y$, y is independently 0 or 1,
for each $(O-R^2)_z$, z is independently 0 to 4,
x, y and z is each independently 0 to 5 provided that x and y can not both be zero, and n is from 1 to 5.

Examples of vinyl carboxylic acids and related compounds which may be used in the formation of the present polymerizable vinyl esters include but are not limited to ethylenically unsaturated mono- and dicarboylic acids such as acrylic acid, methacrylic acid, itaconic acid, crotonic acid, cinnamic acid, fumanic acid, maleic acid, maleic anhydride and the like, unsaturated (meth)acrylates such as methyl (meth)acrylate, ethyl (meth)acrylate, propyl (meth)acrylate, butyl (meth) acrylate, 2-ethylhexyl (meth)acrylate, glycidyl (meth)acrylate, dodecyl (meth)acrylate and the like, nitriles such as (meth)acrylonitrile, amides such as (meth)acrylamide, N-methylol (meth)acrylamide, diacetone (meth)acrylamide, diethylaminoethyl (meth)acrylamide and the like. For certain embodiments, methacrylic acid is preferred. Examples of alcohols having an unsaturated group includes, among others, half-esters derived from unsaturated dicarboxylic acids and/or unsaturated alcohols-such as hydroxyalkyl acrylates, for example, hydroxyethyl (meth)acrylate, hydroxypropyl (meth)acrylate, hydroxybutyl (meth)acrylate, pentaerythritol tri(meth)acrylate, glycerin di(meth)acrylate and the like. Preferably, the acid or related unsaturated compound is one in which the reactive vinyl group is a terminal group.

Regarding the reactivity, flow performance and miscibility of the polymerizable vinyl ester resin, it is generally preferred that the vinyl ester resins of the present invention have an ester number of from about 0 to about 25 mg KOH/g resin and which, when available in the form of a solution of 50 to 70% of reactive diluent monomer, have a viscosity of from about 50 to about 2000 mPa s at 23° C.

Generally, the polymerizable vinyl ester is present in the anchoring composition in the range of from about 20% to about 90% by weight of the entire adhesive composition, and even more preferably in an amount in the range of about 20% to about 70%.

In preferred embodiments, the vinyl ester corresponds to formula III below:

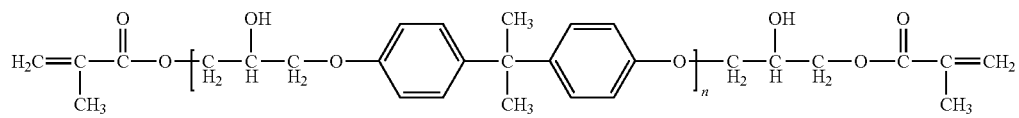

wherein
Ar is substituted or unsubstituted aromatic radical with a valence of at least two,
R is independently a substituted or unsubstituted divalent radical derived from alkyl or arylalkyl,
$R^3$ is a hydroxy substituted divalent radical derived from an alkyl radical,
$R^4$ is independently a vinyl carboxy radical or a epoxy radical, provided that the ratio of n to the number of vinyl carboxy $R^4$ groups is, on average for the composition, from about 0.4 to about 2.0, and
n is from 1 to 5.

In highly preferred embodiments, the polymerizable vinyl ester corresponds to formula (IV) below:

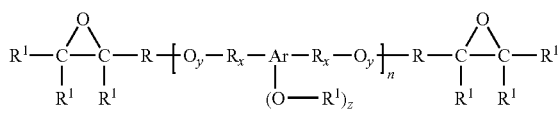

where n is from 1 to about 5 and wherein the ratio of n to the terminal vinyl units is, on average for the composition, from about 0.4 to about 2.0. A vinyl ester composition corresponding to formula (IV) is available from Reichhold under the trade designation Norpol Dion Ver 9165 in a 65% by weight solution with vinyl toluene.

The Reactive Diluent

In general, it is contemplated that the teachings of the present invention can be used with great advantage in connection with any one of the large number of known reactive diluents, particularly reactive monomers. Example of reactive diluents which may be use in connection with the broad teachings hereof include, among others, aliphatic vinyl compounds such as vinyl-, propene- and butene chloride, aromatic vinyl compounds such as styrene, vinyl toluene, divinyl benzene, p-t-butylstyrene and so on, diene compounds such as butadiene, isoprene, chloroprene, pentadiene and the like. Such reactive diluents can be used alone or in combination. Nevertheless, the preferred aspects of the present invention contemplate the avoidance of styrene in the composition, and for this reason the preferred compositions do not contain a substantial amount of styrene. In highly preferred embodiments, the reactive diluent comprises vinyl toluene, an preferably comprises at least about 50% by weight of vinyl toluene, and even more preferably at least about 70% by weight of vinyl toluene, with the balance of the components making up the reactive diluent, if any, being free of any substantial amount of styrene.

While it is contemplated that the amount of reactive diluent relative to the amount of polymerizable vinyl ester in the composition may vary widely depending on numerous factors particular to each application and contemplated use, it is generally preferred that the vinyl ester:reactive diluent weight ratio is from about 0.8 to about 3, more preferably from about 0.8 to about 1.5, and even more preferably from about 0.8 to about 1.3. Optionally but preferably the polymerizable vinyl ester is soluble in the reactive diluent.

Inhibitor

Inhibitors, and particularly free-radical inhibitors, are known to those skilled in the art. A preferred free-radical inhibitor is hydroquinone. Other suitable free-radical inhibitors include, but are not limited to, trimethylhydroquinone, hydroquinone monomethyl ether, t-butyl catechol and naphthaquinone. It is also contemplated that more than one free radical inhibitor may be employed in the anchor composition. The polymerization inhibitor preferably comprises, more preferably comprises in major proportion, and even more preferably consists essentially of hydroquinone. Of course other inhibitor may be used alone or in combination with hyrdoquinone, such as for example, parabenzoquinone, methylhydroquinone, catechol and the like which are conventionally employed as polymerization inhibitors.

While it is contemplated that the amount of inhibitor in the composition may vary widely depending on numerous factors particular to each application and contemplated use, it is generally preferred that the inhibitor is present in amounts of from about 0.005 wt % to about 5 wt %, and even more preferably from about 0.01 wt % to about 0.1 wt %. Optionally but preferably the polymerizable vinyl ester is soluble in reactive diluent.

Initiator

The vinyl ester resin composition of this invention can be easily cured by adding a curing catalyst, an initiator, or both. Representative initiators include aldehyde-amine condensation product, organic sulfonyl chlorides, tertiary amines or mixtures thereof. For example, such a condensation product can be made from butyraldehyde and a primary amine, such an amine being, for example, aniline or butylamine. Also suitable as activators are tertiary amines such as N,N-dimethyl aniline, N,N-dimethyl toluidine, N,N-diethylaniline, N,N-diethyl toluidine, N,N-di-(2-hydroxy-ethy)-p-toluidine, N,N-bis(2-hydroxyethyl)-p-toluidine, N,N-bis(hydroxypropyl)-p-toluidine and the like. A preferred activator is N,N-di-(2-hydroxy-ethy)-p-toluidine. The curing catalysts include organic peroxides such as methylethylketone peroxides, t-butyl peroxybenzoates, benzoyl peroxides, dicumyl peroxides and the like.

While it is contemplated that the amount of inhibitor in the composition may vary widely depending on numerous factors particular to each application and contemplated use, it is generally preferred that the inhibitor is present in amounts of from about 0.005 wt % to about 5 wt %, and even more preferably from about 0.01 wt % to about 0.1 wt %. Optionally but preferably the polymerizable vinyl ester is soluble in reactive diluent.

Thixotroptic Agents

The present anchor composition may also comprise a thixotropic agent. The preferred hixotropic agent of the present invention causes the composition to become more fluid, i.e. less viscous, when agitated, stirred or mixed or otherwise subjected to such shear forces. It is useful to include a thixotropic agent in the anchor composition to insure that the composition has the desired viscosity during application and after the composition is applied. In addition, a thixotropic agent may be added to an anchor composition to prevent the settling of other solid components of the composition and to increase the viscosity of the composition. The thixotropic agent also facilitates dispensing of the composition because when a shear force is applied, e.g. expulsion of the composition from a dispensing gun, the thixotropic agent makes the resulting composition less viscous, and therefore, more easy to expel from the cartridges of the dispensing gun. The thixotropic agent may be found in the anchor composition in an amount in the range of from about 0.5 wt % to about 10 wt %, and more preferably from about 1 wt % to about 5 wt %. Typically, the use of thixotropic agent is not needed when the anchor composition is dispensed using a glass capsule. An example of a suitable preferred thixotropic agent is fumed silica. Also contemplated are the various silicas made by the various methods known in the art, including pyrolysis of silicon tetrachloride and precipitation. Other suitable thixotropic agents include the various organoclays and various fibers. In some anchor compositions, the thixotropic agent may also be considered a filler. A suitable silica thixotropic agent is Aerosil® R202, which may be obtained from the Degussa Corporation of Ridgefield Park, N.J. It is also contemplated that more than one thixotropic agent may be used in the anchor composition Fillers The anchor composition of the present invention also preferably comprises one or more fillers. Fillers are typically added to compositions for various reasons, including to reduce shrinkage of the composition that may occur during polymerization and to reduce the cost of the composition, as fillers replace a portion of the more expensive components of the anchor composition. The filler may also provide for improved bond strength of the anchor composition when polymerized and help to prevent the settling out of other particulate materials in the composition. Generally, the filler is an inert, inorganic, solid, particulate compound. By inert it is meant that the filler does not detrimentally interact with any other component of the composition. Examples of suitable fillers include, but are not limited to, crushed glass, glass beads, quartz, silica, limestone, alumina, various clays, diatomaceous earth and other materials such as mica, flint powder, kryolite, alumina trihydrate, talc, sand, pyrophyllite, blanc fixe, granulated polymers such as polyethylene, hollow glass and polymer beads, zinc oxide, novaculite, calcium sulfate and mixtures thereof. Preferred fillers are quartz, glass and silica. Fillers may be treated with coupling agents to improve bonding to the polymer matrix. Examples of coupling agents, which may be used to treat the fillers, are silanes, titanates and zirconates.

Preferably, the present compositions contain fillers an amount of from about 10% to about 80% by weight of the composition, more preferably from about 20 wt % to about 70 wt %, and even more preferably from about 30 wt % to about 60 wt %.

The exact particle size of the filler will depend on the desired consistency of the composition and the method for dispensing the anchor composition. For example, fillers having a large average particle size (300 microns and larger) may clog static mixers that are used in dispensing systems such as dispensing guns. On the other hand, fillers having a large particle size can be used in glass capsules. Preferred particle sizes are about 50 microns or larger. However, in cases where a filler is used to prevent the settling out of other particulate matter in a composition, a particle size smaller than 50 microns may be desired. It is also recognized that a filler having a particle size less than 50 microns may be used in combination with other fillers, some having particle sizes greater than 50 microns.

Other Additives

The anchor composition may also contain a fragrance. A fragrance is used in an anchoring composition to mask any odor of the composition that is thought undesirable or unpleasant. A preferred fragrance is Atlanta Fragrance 16332. Similarly, a pigment may be employed to color the anchoring composition. Suitable pigments are known to those skilled in the art.

Preferred Two Component Adhesives

In one embodiment of the present invention, the anchor composition is formed by mixing a first composition and a second composition. The first composition contains the polymerizable vinyl ester compound and preferably also at least a substantial amount, and preferably substantially all of the reactive diluent if present. The first composition also preferably contains an inhibitor to inhibit curing of the adhesive until desired, and the second composition contains a free-radical catalyst. When the first composition and the second composition are combined, polymerization occurs.

In a preferred embodiment, the first composition comprises vinyl ester and a filler. The first composition may also comprise a thixotropic agent, a chain transfer agent, a free-radical inhibitor, a fragrance, an activator, a promoter and/or a pigment. The second composition preferably contains a free-radical catalyst. The second composition may also include filler, a thixotropic agent, a fragrance, and/or a pigment. It is also contemplated that both the first composition and the second composition may contain some of the same components.

The weight ratio of the first composition to the second composition may be in the range of 1 to 1 to about 40 to 1. Preferably, the weight ratio of the first composition (Part A) to the second composition (Part B) is about 10 to 1.

EXAMPLES

The following examples are provided to illustrate particular embodiments of the invention and are not intended to limit the scope of the invention or the claims in any manner.

Experimental Protocols

Preparation of Two Part Anchor Compositions

The appropriate amounts of polymerizable vinyl ester resin are prepared. To the resin is added the appropriate amount of inhibitor, activator, fragrance and other ingredients. The composition is mixed, preferably using a dispenser. Next, the thixotropic agent is added with shear mixing followed by addition of the filler. If more than one filler is to be included in the anchor composition, it is preferable to add the first filler, then mix, then add the second filler and so on until the desired number of fillers have been added to the composition until Part A of the composition is complete. The same general procedure as described above is used to make Part B consisting of catalyst thixotropic agent, filler, pigment and other ingredients.

The above preparation procedure is used for the examples, except for the comparative example, in which case the adhesive was prepared in accordance with the instructions provided.

Pull Out Performance

A medium weight concrete block approximately 4"×8"16" substantially free of surface moisture is used. Typically, five replicate pull out tests are run for each adhesive composition tested. First, three equally spaced 110 mm deep holes approximately 14 mm wide are drilled in the 8"×16" side of the concrete block. Then, the holes are cleaned with a brush, with compressed air and a vacuum. An adhesive composition is injected into the drilled holes, and a ¼"–20 threads per inch.×12 mm stainless steel rod type 304 is inserted into the adhesive-containing hole with a twisting motion. The time before pull out testing (also called cure time) is in the range of about 0.5 hours to about 72 hours, as reported. The stainless steel rod was then connected to an Instron universal tester, Model TTC, Instron Corporation, Canton, Mass., and the rods are pulled at 0.2"/minute until failure. The maximum load and failure type was then recorded. Preferably, in an acceptable anchor composition, the pull out performance at one hour at a temperature of 30 C is at least about 55 KN, at about 24 hour at a temperature of 30 C is at least about 65 KN, and after about 24 hours at about 80 C as measured at a temperature of 80° C. is at least about 45 KN. Most preferably, the material that has been anchored to the concrete or masonry, or the concert or masonry itself fails before the adhesive composition. As can be seen from the following examples, the compositions of the present invention are capable of achieving pull out performance at one hour at a temperature of 23 C of at least about 75 KN (i.e., 80 KN), at about 24 hours at a temperature of 23 C of at least about 90 KN (i.e., about 94 KN), and after about 24 hours is measured at a temperature of 80° C. of at least about 60 KN (i.e., about 62 KN).

Comparative Example

A leading commercially available anchor adhesive sold under the trade designation HY-150 by Hilti Aktiengesellschaft of Schaan, Liechtenstein is prepared and used in accordance with the instructions provided to measure various performance parameters as outlined in the above protocols. The following results are observed:

Adhesive—HY-150
Pullout, 1 Hr. (KN)—53
Pullout, 24 Hr. (KN)—61.8
Pullout, 80° C. (KN)—41.6
Gel Time, min. (Trombomat)—9
Pumpability—good

Example 1

A two part adhesive composition having a Part A:Part B weight ratio of 10:1 and the following formulations for Part A and Part B is prepared and used according to the above protocols:

| PART A | | | |
|---|---|---|---|
| COMPONENT | Wt. % in Part A | Wt % in A + B | pbwa |
| Vinyl ester resin* | 33.08 | 30.07 | 69.29 |
| Inhibitor (hydroquinone) | 0.03 | 0.03 | 0.06 |
| Initiator (Pergaquick A-150) | 0.37 | 0.34 | 0.78 |
| Thixotropic Agent (Aerosil R202) | 2.70 | 2.45 | 0 |
| Filler (Sand) | 54.52 | 49.56 | 0 |
| Acrylate (SR-351) | 9.31 | 8.46 | 19.5 |

*The vinyl ester resin comprises about 35 wt % polymerizable vinyl ester compound(s) in accordance with the present invention and about 65 wt % of reactive monomer consisting of vinyl toluene.

| PART B | | | |
|---|---|---|---|
| COMPONENT | Wt. % in Part B | Wt % in A + B | pbwa |
| Catalyst (Cadox 40 E) | 49.51 | 4.50 | 10.37 |
| Thixotropic Agent (Tixogel VZ) | 1.99 | 0.18 | 0 |
| Filler (Sand) | 47.52 | 4.32 | 0 |
| Pigment (TiO2) | 0.99 | 0.09 | 0 |

The various performance parameters as outlined in the above protocols are measured for the adhesive composition and the following results are observed:

Pullout, 1 Hr. (KN)—80.5
Pullout, 24 Hr. (KN)—94.5
Pullout, 80° C. (KN)—61.9
Gel Time, min. (Trombomat)—7
Pumpability—good

The invention claimed is:

1. A curable adhesive composition for anchoring materials in or to concrete or masonry comprising:
   a. vinyl ester resin comprising:
      i. from about 10 wt % to about 25 wt % of one or more polymerizable epoxy vinyl ester compounds; and
      ii. an ethylenically unsaturated monomer reactive with said one or more polymerizable epoxy vinyl ester compounds; and further comprising:
   b. from about 5 wt % to about 10 wt % of reactive multifunctional acrylate;
   c. curing catalyst; and
   d. activator;
   said adhesive composition characterized in that it cures to provide a pull out performance after one hour at a temperature of 23° C. of at least about 70 KN.

2. The adhesive composition of claim 1 wherein said reactive multifunctional acrylate comprises acrylate that is at least tri-functional.

3. The adhesive composition of claim 1 wherein said reactive multifunctional acrylate consists essentially of acrylate that is at least tri-functional.

4. The adhesive composition of claim 1 wherein said reactive multifunctional acrylate comprises acrylate that is at least tetra-functional.

5. The adhesive composition of claim 1 wherein said reactive multifunctional acrylate consists essentially of acrylate that is at least tetra-functional.

6. The adhesive composition of claim 1 wherein said ethylenically unsaturated monomer comprises vinyl toluene.

7. The adhesive composition of claim 1 wherein the weight ratio of vinyl ester to said ethylenically unsaturated monomer is from about 0.8 to about 3.

8. The adhesive composition of claim 1 characterized in that it cures to provide a pull out performance after about 24 hours at a temperature of 23° C. of at least about 80 KN.

9. The adhesive composition of claim 1 characterized in that it cures to provide a pull out performance after about 24 hours at a temperature of 80° C. of at least about 50 KN.

10. A curable adhesive composition for anchoring materials in or to concrete or masonry comprising: a curable resin comprising a polymerizable polymer and an ethylenically unsaturated monomer reactive with said polymerizable polymer; and further comprising from about 5 pbwa to about 30 pbwa of reactive multifunctional acrylate; curing catalyst; and activator, said composition characterized in that it cures to provide a pull out performance after about 24 hours at a temperature of 80° C. of at least about 50 KN.

11. The adhesive composition of claim 10 wherein said curable resin is selected from the group consisting of acrylic resins, vinyl ester resins, urethane resins, polyester resins and combinations of two or more of these.

12. The adhesive composition of claim 10 wherein said curable resin comprises polymerizable vinyl ester in amount of from about 10 wt % to about 25 wt % of the composition.

13. The adhesive composition of claim 12 wherein said reactive multifunctional acrylate comprises a major proportion of acrylate that is at least tri-functional.

14. The adhesive composition of claim 13 wherein said reactive multifunctional acrylate consists essentially of acrylate that is at least tri-functional.

15. The adhesive composition of claim 12 wherein said reactive multifunctional acrylate comprises acrylate that is at least tetra-functional.

16. The adhesive composition of claim 15 wherein said reactive multifunctional acrylate consists essentially of acrylate that is at least tetra-functional.

17. A curable adhesive composition for anchoring materials in or to concrete or masonry comprising:
  a. vinyl ester resin comprising:
    i. from about 10 wt % to about 25 wt % of one or more polymerizable epoxy vinyl ester compounds; and
    ii. an ethylenically unsaturated monomer reactive with said one or more polymerizable epoxy vinyl ester compounds; and further comprising:
  b. from about 5 wt % to about 10 wt % of reactive multifunctional acrylate, and further wherein said multifunctional acrylate comprises a major proportion of acrylate that is at least tri-functional;
  c. curing catalyst; and
  d. activator.

18. The adhesive composition of claim 17 wherein said reactive multifunctional acrylate consists essentially of acrylate that is at least tri-functional.

19. The adhesive composition of claim 17 wherein said reactive multifunctional acrylate comprises acrylate that is at least tetra-functional.

20. The adhesive composition of claim 17 wherein said reactive multifunctional acrylate consists essentially of acrylate that is at least tetra-functional.

21. The adhesive composition of claim 1, wherein the ethylenically unsaturated monomer is selected from the group consisting of vinyl propene, butane chloride, styrene, vinyl toluene, divinyl benzene, p-t-butylstyrene, butadiene, isoprene, chloroprene, pentadiene and combinations thereof.

22. The adhesive composition of claim 21, wherein the multifunctional acrylate is selected from the group consisting of trimethylolpropane triacrylate and dipentaerythritol tetraacrylate.

23. The adhesive composition of claim 1, wherein the polymerizable epoxy vinyl ester compound is selected from the group consisting of bisphenolic type epoxy vinyl ester compounds, epoxy novolak type vinyl ester compounds, and amine type epoxy vinyl ester compounds, and further wherein the multifunctional acrylate is selected from the group consisting of trimethylolpropane triacrylate and dipentaerythritol tetraacrylate.

24. The adhesive composition of claim 23, wherein the ethylenically unsaturated monomer is selected from the group consisting of vinyl propene, butane chloride, styrene, vinyl toluene, divinyl benzene, p-t-butylstyrene, butadiene, isoprene, chloroprene, pentadiene and combinations thereof.

* * * * *